US006131391A

United States Patent [19]

Poorman

[11] Patent Number: 6,131,391

[45] Date of Patent: Oct. 17, 2000

[54] CONTROL SYSTEM FOR CONTROLLING THE SPEED OF A HYDRAULIC MOTOR

[75] Inventor: Bryan G. Poorman, Princeton, Ill.

[73] Assignee: Caterpillar Inc., Peoria, Ill.

[21] Appl. No.: 09/220,744

[22] Filed: Dec. 23, 1998

[51] Int. Cl.[7] .......... F16D 31/02

[52] U.S. Cl. .......... 60/448; 60/452; 60/489; 91/454

[58] Field of Search .......... 60/448, 452, 489; 91/454, 457

[56] References Cited

U.S. PATENT DOCUMENTS

| | | | |
|---|---|---|---|
| 4,407,122 | 10/1983 | Nanda | 60/452 |
| 4,416,187 | 11/1983 | Nystrom | 91/454 X |
| 4,586,331 | 5/1986 | Ohman . | |
| 4,611,527 | 9/1986 | Breeden | 60/452 X |
| 4,718,329 | 1/1988 | Nakajima et al. . | |
| 5,138,838 | 8/1992 | Crosser . | |
| 5,211,196 | 5/1993 | Schwelm | 91/454 X |
| 5,743,165 | 4/1998 | Tanaka et al. | 91/454 X |
| 5,868,059 | 2/1999 | Smith | 91/454 |
| 5,960,695 | 10/1999 | Aardema et al. | 91/454 X |

*Primary Examiner*—John E. Ryznic

*Attorney, Agent, or Firm*—Haverstock Garrett & Roberts

[57] ABSTRACT

A control system for a hydraulic circuit having a tank, a pump, a supply conduit connected to the pump, a reversible hydraulic motor, an input conduit connected to the motor and an output conduit connected to the motor is disclosed which comprises a first, second, third, and fourth independently operable electrohydraulic metering valve, the second and third valves being disposed between the supply conduit, the first and second valves being disposed between the input conduit, and the third and fourth valves being disposed between the output conduit, a first pressure sensor connected to the supply conduit for sensing a pressure within the supply conduit, a second pressure sensor connected to the input conduit for sensing a pressure within the input conduit, a third pressure sensor connected to the output conduit for sensing a pressure within the output conduit, a speed and directional sensor connected to the motor for sensing the speed and direction of the motor, and a controller connected to the pump, the valves, and the sensors for controlling operation of the pump and the valves and for receiving signals from the sensors indicative of the pressure within the supply and motor conduits and the speed and direction of the motor, the controller for determining whether an overspeed condition is present and for actuating one of the valves when an overspeed condition is present.

20 Claims, 2 Drawing Sheets

CONTROL SYSTEM FOR CONTROLLING THE SPEED OF A HYDRAULIC MOTOR

TECHNICAL FIELD

This invention relates generally to a hydraulic circuit and more particularly to a control system for a hydraulic circuit having control valves arranged for the valves to control fluid flow to and from a reversible hydraulic motor and also to control the speed of the motor.

BACKGROUND ART

Hydraulic circuits for controlling a reversible hydraulic motor typically include a pump for circulating a hydraulic fluid, various conduits, and numerous valves. Some valves which are employed in such circuits include a three-position four-way directional control valve having a single spool for controlling fluid flow from the pump to the motor and from the motor to a tank, a pair of line reliefs operatively associated with opposite sides of the reversible hydraulic motor, one or more counterbalance valves, load check valves to block reversible flow of fluid if the load pressure is higher than the pump pressure at the time the directional control valve is shifted, and make-up valves. One problem encountered with such circuits is that there is no way to avoid or compensate for an overspeed condition of the hydraulic motor. For example, an operator may want to have the hydraulic motor operate at a preselected speed. However, the pump, which supplies hydraulic fluid to the motor, may cause the motor to go faster than the preselected speed. In such a case, there should be some mechanism associated with either the hydraulic circuit or the motor for braking or slowing the motor down to the preselected speed.

In view of the above, it would be desirable to provide a control system for detecting an overspeed condition and for braking the hydraulic motor once an overspeed condition is detected or occurs. Further, it would be advantageous to remove some of the hydraulic fluid from the hydraulic circuit to be used by the pump at a later time. It would also be desirable to construct such a control system which minimizes the number of valves that need to be used to reduce the cost associated with construction and the time required to develop such control systems.

Accordingly, the present invention is directed to overcoming one or more of the problems as set forth above.

DISCLOSURE OF THE INVENTION

In one embodiment of the present invention, a control system for a hydraulic circuit having a tank, a pump, a supply conduit connected to the pump, a reversible hydraulic motor, an input conduit connected to the motor and an output conduit connected to the motor is disclosed which comprises a first, second, third, and fourth independently operable electrohydraulic metering valve, the second and third valves being disposed between the supply conduit, the first and second valves being disposed between the input conduit, and the third and fourth valves being disposed between the output conduit, a pressure sensor connected to the supply conduit for sensing a pressure within the supply conduit, a pressure sensor connected to the input conduit for sensing a pressure within the input conduit, a pressure sensor connected to the output conduit for sensing a pressure within the output conduit, a speed and directional sensor connected to the motor for sensing the speed and direction of the motor, and a controller connected to the valves and the sensors.

Another embodiment of the present invention is a control system for a hydraulic circuit having a tank, a pump, a supply conduit connected to the pump, a reversible hydraulic motor, a motor input conduit connected to the motor and a motor output conduit connected to the motor, the system comprises a first, second, third, and fourth independently operable electrohydraulic metering valve, the second and third valves being disposed between the supply conduit, the first and second valves being disposed between the motor input conduit, and the third and fourth valves being disposed between the motor output conduit, a first pressure sensor connected to the supply conduit for sensing a pressure within the supply conduit, a second pressure sensor connected to the motor input conduit for sensing a pressure within the motor input conduit, a third pressure sensor connected to the motor output conduit for sensing a pressure within the motor output conduit, an output conduit connected between the first valve and the fourth valve and the tank, a speed and directional sensor connected to the motor for sensing the speed and direction of the motor, and a controller connected to the pump, the valves, and the sensors for controlling operation of the pump and the valves and for receiving signals from the sensors indicative of the pressure within the supply and motor conduits and the speed and direction of the motor, the controller for determining whether an overspeed condition is present and for actuating one of the valves when an overspeed condition is present.

In another embodiment of the present invention a control system for a hydraulic circuit having a tank, a pump for supplying a hydraulic fluid within the hydraulic circuit, a supply conduit connected to the pump, a reversible hydraulic motor, a motor input conduit connected to the motor and a motor output conduit connected to the motor is disclosed in which the system comprises a first, second, third, and fourth independently operable electrohydraulic metering valve, the second and third valves being disposed between the supply conduit, the first and second valves being disposed between the motor input conduit, and the third and fourth valves being disposed between the motor output conduit, a first pressure sensor connected to the supply conduit for sensing a pressure within the supply conduit, a second pressure sensor connected to the motor input conduit for sensing a pressure within the motor input conduit, a third pressure sensor connected to the motor output conduit for sensing a pressure within the motor output conduit, an output conduit connected between the first valve and the fourth valve and the tank, a speed and directional sensor connected to the motor for sensing the speed and direction of the motor, and a controller connected to the pump, the valves, and the sensors for controlling operation of the pump and the valves and for receiving signals from the sensors indicative of the pressure within the supply and motor conduits and the speed and direction of the motor, the controller for determining whether an overspeed condition is present and for actuating the first valve and the third valve when an overspeed condition is present, actuation of the first valve for providing hydraulic fluid from the first valve through the output conduit to the tank.

BEST MODE FOR CARRYING OUT THE INVENTION

Figure 1:
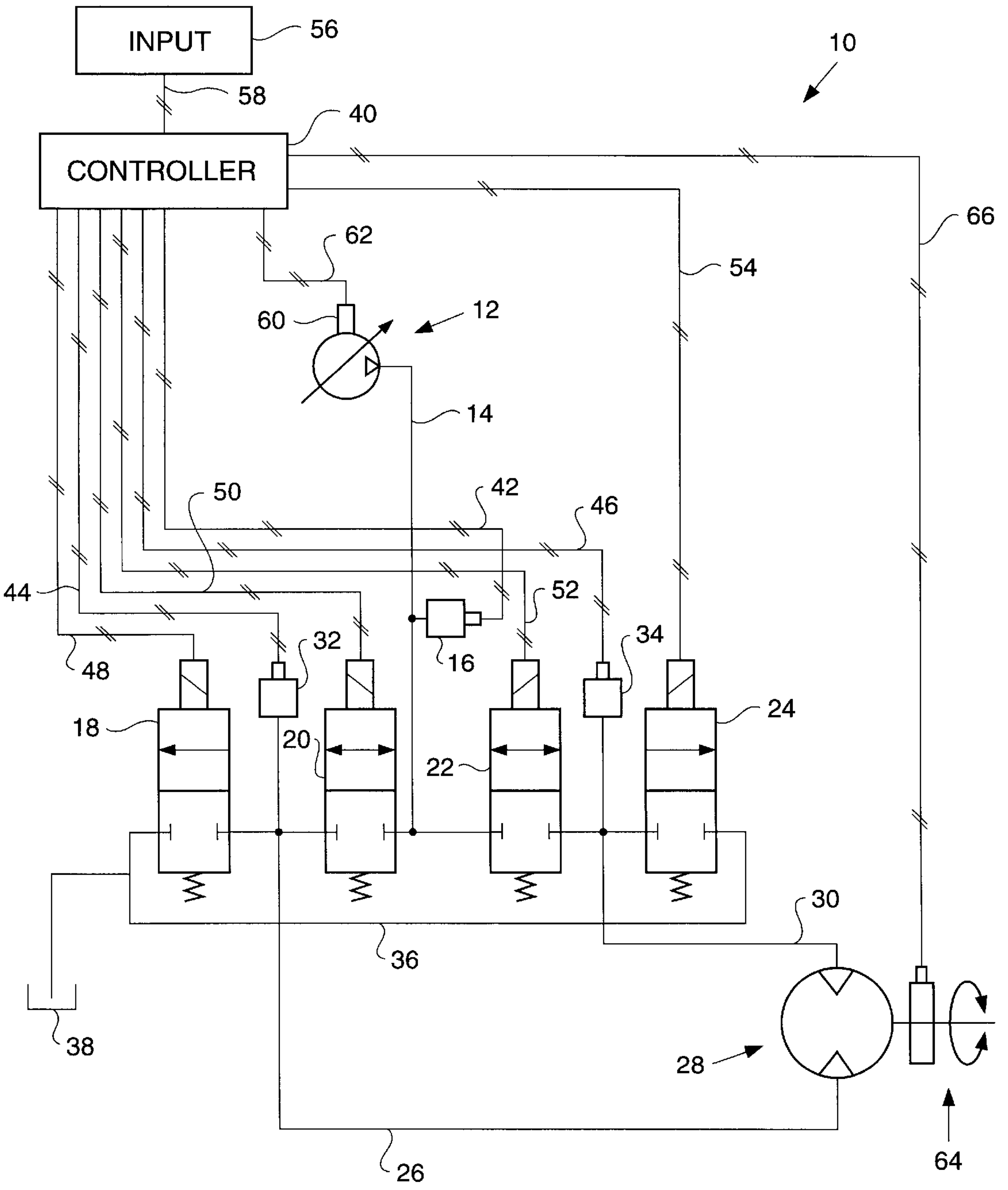
FIG. 1 is a schematic illustration of a regenerative electrohydraulic control circuit constructed according to the present invention.

Referring now to the drawings, FIG. 1 illustrates a control system 10 which has a supply such as a hydraulic fluid pump

12 having a supply conduit 14 for supplying a hydraulic fluid within the control system 10. A pressure sensor 16 is connected to the supply conduit 14 to sense the pressure within the supply conduit 14. The supply conduit 14 is connected to a pair of electronic actuated independent metering valves 20 and 22 which are part of a set of electronic actuated independent metering valves 18, 20, 22, and 24. The valves 18 and 22 are connected by an input motor conduit 26 to a bi-directional hydraulic motor 28. The motor 28 is also connected back to the valves 22 and 24 by an output motor conduit or exhaust conduit 30. A pressure sensor 32 is shown connected between the valves 18 and 20 to sense the pressure in the input motor conduit 26. Another pressure sensor 34 is connected between the valves 22 and 24 for sensing the pressure in the exhaust conduit 30. Another conduit such as an output conduit 36 connects the valves 18 and 24 to a tank 38.

The control system 10 further includes a controller 40, such as a microprocessor, which is used to control operation of the control system 10. The controller 40 is connected to the pressure sensors 16, 32, and 34 by electrical leads 42, 44, and 46, respectively. The controller 40 is capable of receiving signals from the sensors 16, 32, and 34 over the leads 42, 44, and 46 to determine the pressure in the supply conduit 14 and the input motor conduit 26 and the output motor conduit 30. The valves 18, 20, 22, and 24 are connected to the controller 40 via electrical connections 48, 50, 52, and 54, respectively. The controller 40 is capable of sending command signals over the connections 48, 50, 52, and 54 to control operation of the valves 18, 20, 22, and 24. The controller 40 also has an input device 56 connected to the controller 40 by a wire 58. The input device 56 may include such devices as an operator lever, pedal, joystick, keypad, or a keyboard for inputting information such as the speed required of the motor 28. The input device 56 is also capable of providing an input signal or command to the controller 40 over the wire 58.

The pump 12 may be a variable displacement pump having an electrohydraulic displacement controller 60 which is operable to control the displacement of the pump 12 in response to receiving an electrical control signal over an electrical lead 62 connected to the controller 40. The extent of displacement may be dependent upon the magnitude of the control signal.

The motor 28 has connected or associated thereto a speed and direction sensor 64 for indicating the speed and direction of the motor 28. The sensor 64 is connected to the controller 40 via an electrical lead 66 to provide information to the controller 40 concerning the speed and direction of the motor 28.

The controller 40 is capable of receiving signals from the pressure sensors 16, 32, and 34 and the speed and direction sensor 64. Based upon these signals the controller 40 is able to control operation of the valves 18, 20, 22, and 24 and the pump 12. In particular, the valves 20 and 24 are initially opened and the valves 18 and 22 are initially closed. Normal operation of the hydraulic motor 28 occurs when the valves 20 and 24 are opened and the valves 18 and 22 are closed. Depending upon the pressures sensed by the pressure sensors 16, 32, and 34, it may be required to first open the valve 22 to correct or compensate for any overspeed condition of the motor 28 being sensed. The opening of the valve 22 restricts the flow of hydraulic fluid, for example, from the motor 28. In essence, this acts to brake or slow down the motor 28. Additionally, it may then be required that the valve 18 be opened to divert the flow of hydraulic fluid back to the tank 38. The output conduit 36 allows fluid to flow from the valve 18 through the conduit 36 into the tank 38 to be used again by the pump 12. This provides for a regenerative supply or source of hydraulic fluid for the pump 12 and in this mode of operation the control system 10 is regenerative.

The operation of the control system 10, as shown in FIG. 1, will be described by referring to a flow chart shown in FIG. 2. In a step 100, an operator command input is determined by reviewing the input from the input device 56 which may correspond to, for example, determining whether an operator lever has been pressed or a number entered by a keypad. Additionally, in the step 100 normal operation of the motor 28 is assumed. For example, the speed and direction sensor 64 sends a signal to the controller 40 and the controller 40 determines whether the speed of the motor 28 either equals the speed set by the input device 56 or is within certain predetermined conditions. Once the input and normal operation has occurred control of the operation of the control system 10 passes to a next step 102. In step 102 it is determined whether the pressure sensed by pressure sensor 16 is greater than the pressure sensed by the pressure sensors 32 and 34. In essence, this determines whether the supply pressure is greater than the loop pressures in the control system 10. If it is determined that the supply pressure is less than the loop pressures the operation branches to a step 104 in which the processor sends a signal out over the lead 62 to increase the supply pressure from the source 12. Once this is accomplished the operation of the control system 10 returns to the step 102.

If it was determined that the supply pressure was greater than the loop pressure then the operation of the control system 10 will proceed from the step 102 to a step 106. In the step 106 it is decided whether the speed and direction of the motor 28 is within certain tolerances or limits. If the speed and the direction of the motor 28 are within certain tolerances or limits then control of the system 10 will return to the step 102. When it is determined that the speed and direction of the motor 28 is outside certain tolerances then control of the system 10 passes to a step 108. In the step 108 it is determined whether the pressure at the pressure sensor 34 is greater than the pressure being sensed by the pressure sensors 16 and 32. When the pressure at the pressure sensor 34 is greater than the pressure being sensed by the pressure sensors 16 and 32 this corresponds to the overspeed condition being detected or sensed. If no overspeed condition is present then control of the system 10 again loops back to the step 102. When an overspeed condition is detected the valve 22 is opened as is shown in a next step 110. After the valve 22 has been opened control of the system 10 loops back up to the step 102.

Figure 2:
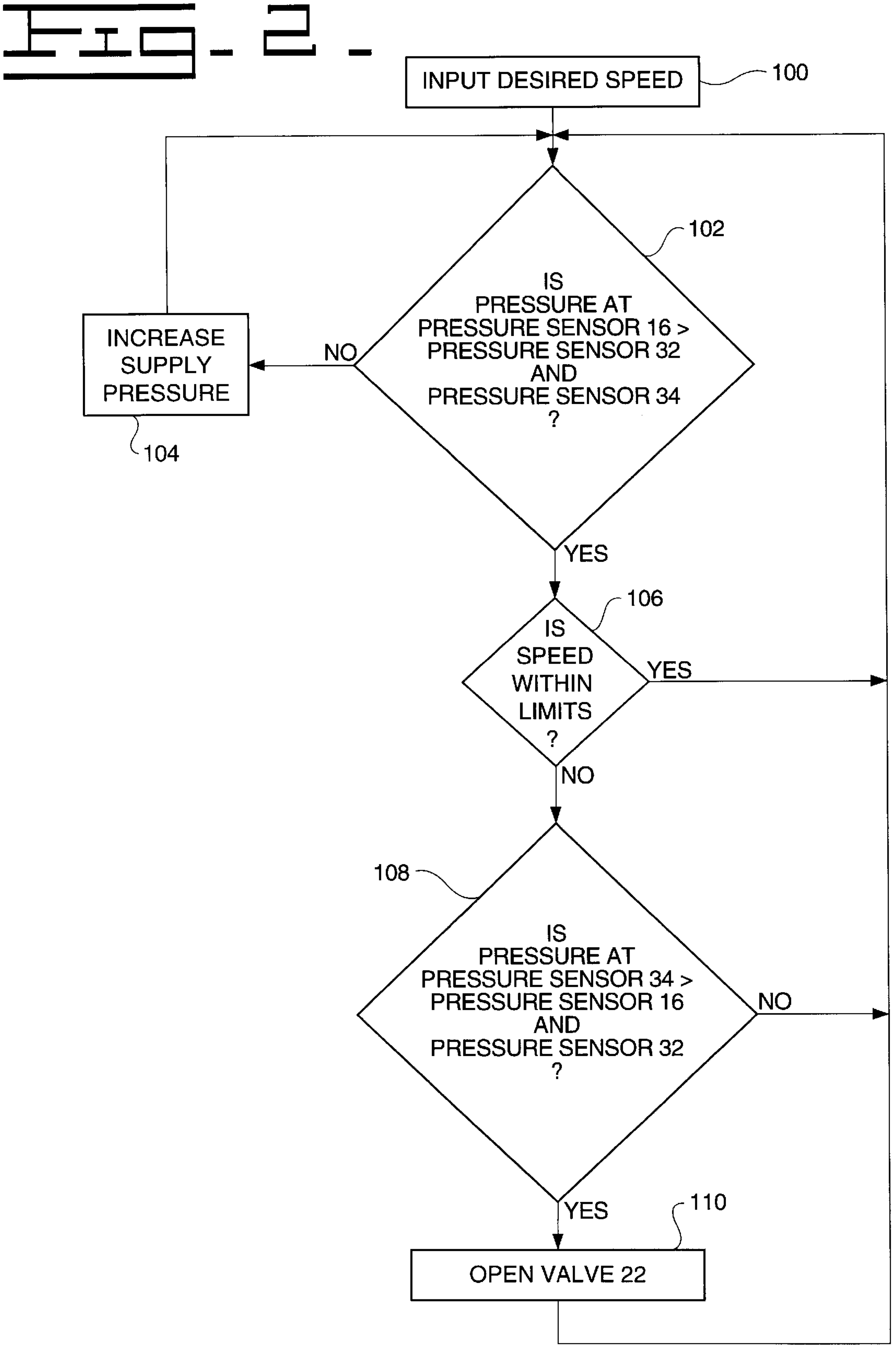
FIG. 2 is a flow chart of a series of operations performed by the control system shown in FIG. 1.

There is another condition which has not been illustrated in FIG. 2. This condition is when an overspeed condition has been detected and it may be advantageous to direct some of the hydraulic fluid back to the tank 38. In such an instance the valve 18 is opened and fluid flows from the valve 18 through the conduit 36 into the tank 38. This step may take place after the step 110 in which the valve 22 has been opened.

INDUSTRIAL APPLICABILITY

The present invention is applicable in situations where hydraulic motors are used in hydraulic circuits and it would be advantageous to protect against overspeed conditions associated with the use of the hydraulic motor. The present invention is also useful for recirculating hydraulic fluid within a hydraulic circuit for use by a source of hydraulic fluid such as a pump. The control system of the present invention is also able to minimize the number of valves required in a control system to correct an overspeed condition once it is detected or sensed.

Pressure sensors are used to sense the pressure in a supply conduit, a motor input conduit, and a motor output conduit to determine whether an overspeed condition is occurring. Whenever the pressure in the motor output conduit is greater than the pressure sensed at the supply conduit and the motor input conduit an overspeed condition is present. The control system of the present invention is capable of actuating an electrohydraulic metering valve to restrict flow of hydraulic fluid from the hydraulic motor whenever an overspeed condition exists.

Other aspects, objects and advantages of the present invention can be obtained from a study of the drawings, the disclosure and the appended claims.

What is claimed is:

1. A control system for a hydraulic circuit having a tank, a pump, a supply conduit connected to the pump, a reversible hydraulic motor, an input conduit connected to the motor and an output conduit connected to the motor, the system comprising:

a first, second, third, and fourth independently operable electrohydraulic metering valve, the second and third valves being disposed between the supply conduit, the first and second valves being disposed between the input conduit, and the third and fourth valves being disposed between the output conduit;

a first pressure sensor connected to the supply conduit for sensing a pressure within the supply conduit;

a second pressure sensor connected to the input conduit for sensing a pressure within the input conduit;

a third pressure sensor connected to the output conduit for sensing a pressure within the output conduit;

a speed and directional sensor connected to the motor for sensing the speed and direction of the motor; and a controller connected to the pump, the valves, and the sensors for controlling operation of the pump and the valves and for receiving signals from the sensors indicative of the pressure within the supply and motor conduits and the speed and direction of the motor, the controller for determining whether an overspeed condition is present and for actuating one of the valves when an overspeed condition is present.

2. The control system of claim 1 further comprising an input connected to the controller for selecting a desired speed of the motor.

3. The control system of claim 1 wherein the second valve and the fourth valve are initially opened and the first valve and the third valve are initially closed.

4. The control system of claim 3 wherein the third valve is opened when an overspeed condition is present.

5. The control system of claim 1 wherein an overspeed condition occurs whenever the pressure sensed by the third pressure sensor is greater than the pressure sensed by the first pressure sensor and the second pressure sensor.

6. The control system of claim 1 wherein a normal operating condition of the motor occurs whenever the pressure sensed by the third pressure sensor is less than the pressure sensed by the first pressure sensor and the second pressure sensor.

7. The control system of claim 1 wherein the controller is capable of actuating another one of the valves whenever an overspeed condition occurs.

8. A control system for a hydraulic circuit having a tank, a pump, a supply conduit connected to the pump, a reversible hydraulic motor, a motor input conduit connected to the motor and a motor output conduit connected to the motor, the system comprising:

a first, second, third, and fourth independently operable electrohydraulic metering valve, the second and third valves being disposed between the supply conduit, the first and second valves being disposed between the motor input conduit, and the third and fourth valves being disposed between the motor output conduit;

a first pressure sensor connected to the supply conduit for sensing a pressure within the supply conduit;

a second pressure sensor connected to the motor input conduit for sensing a pressure within the motor input conduit;

a third pressure sensor connected to the motor output conduit for sensing a pressure within the motor output conduit;

an output conduit connected between the first valve and the fourth valve and the tank;

a speed and directional sensor connected to the motor for sensing the speed and direction of the motor; and a controller connected to the pump, the valves, and the sensors for controlling operation of the pump and the valves and for receiving signals from the sensors indicative of the pressure within the supply and motor conduits and the speed and direction of the motor, the controller for determining whether an overspeed condition is present and for actuating one of the valves when an overspeed condition is present.

9. The control system of claim 8 further comprising an input connected to the controller for selecting a desired speed of the motor.

10. The control system of claim 8 wherein the second valve and the fourth valve are initially opened and the first valve and the third valve are initially closed.

11. The control system of claim 10 wherein the third valve is opened when an overspeed condition is present.

12. The control system of claim 8 wherein an overspeed condition occurs whenever the pressure sensed by the third pressure sensor is greater than the pressure sensed by the first pressure sensor and the second pressure sensor.

13. The control system of claim 8 wherein a normal operating condition of the motor occurs whenever the pressure sensed by the third pressure sensor is less than the pressure sensed by the first pressure sensor and the second pressure sensor.

14. The control system of claim 8 wherein the controller actuates another one of the valves when an overspeed condition is present.

15. The control system of claim 14 wherein the valve which is actuated is the first valve.

16. A control system for a hydraulic circuit having a tank, a pump for supplying a hydraulic fluid within the hydraulic circuit, a supply conduit connected to the pump, a reversible hydraulic motor, a motor input conduit connected to the motor and a motor output conduit connected to the motor, the system comprising:

a first, second, third, and fourth independently operable electrohydraulic metering valves, the second and third valves being disposed between the supply conduit, the first and second valves being disposed between the motor input conduit, and the third and fourth valves being disposed between the motor output conduit;

a first pressure sensor connected to the supply conduit for sensing a pressure within the supply conduit;

a second pressure sensor connected to the motor input conduit for sensing a pressure within the motor input conduit;

a third pressure sensor connected to the motor output conduit for sensing a pressure within the motor output conduit;

an output conduit connected between the first valve and the fourth valve and the tank;

a speed and directional sensor connected to the motor for sensing the speed and direction of the motor; and a controller connected to the pump, the valves, and the sensors for controlling operation of the pump and the valves and for receiving signals from the sensors indicative of the pressure within the supply and motor conduits and the speed and direction of the motor, the controller for determining whether an overspeed condition is present and for actuating the first valve and the third valve when an overspeed condition is present, actuation of the first valve for providing hydraulic fluid from the first valve through the output conduit to the tank.

17. The control system of claim 16 further comprising an input connected to the controller for selecting the speed of the motor.

18. The control system of claim 16 wherein an overspeed condition occurs whenever the pressure sensed by the third pressure sensor is greater than the pressure sensed by the first pressure sensor and the second pressure sensor.

19. The control system of claim 16 wherein a normal operating condition of the motor occurs whenever the pressure sensed by the third pressure sensor is less than the pressure sensed by the first pressure sensor and the second pressure sensor.

20. The control system of claim 16 wherein the second valve and the fourth valve are initially opened and the first valve and the third valve are initially closed.

* * * * *